Aug. 2, 1927.
A. MARTINDALE
1,637,495
APPARATUS FOR MOLDING PLASTIC BLOCKS
Filed May 29, 1926
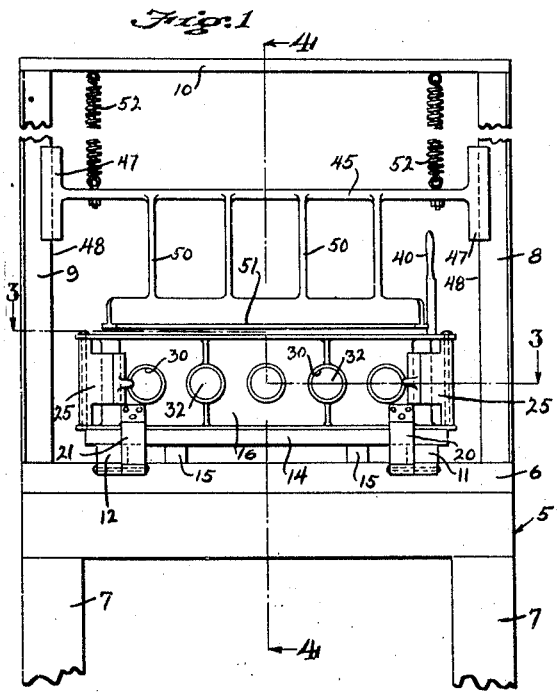
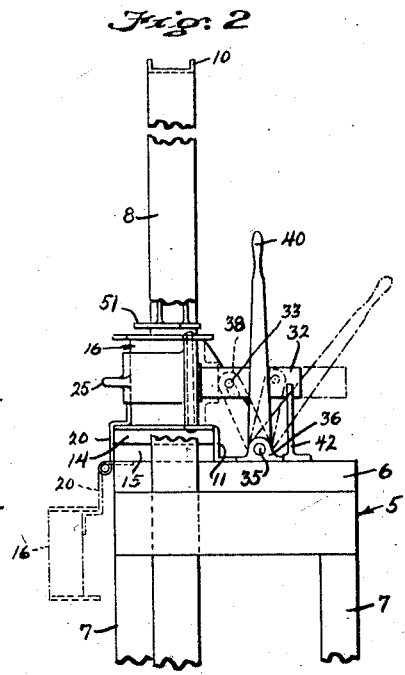
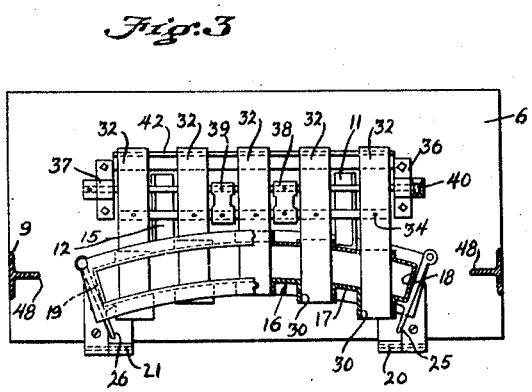
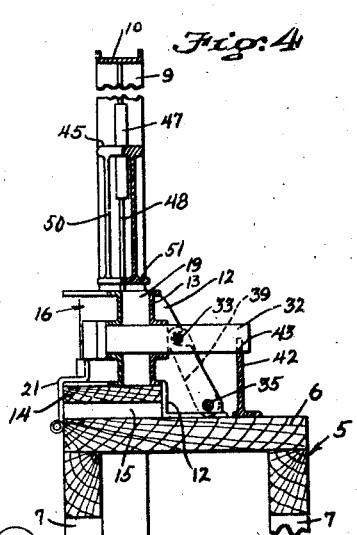
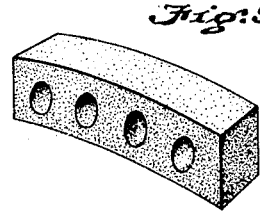
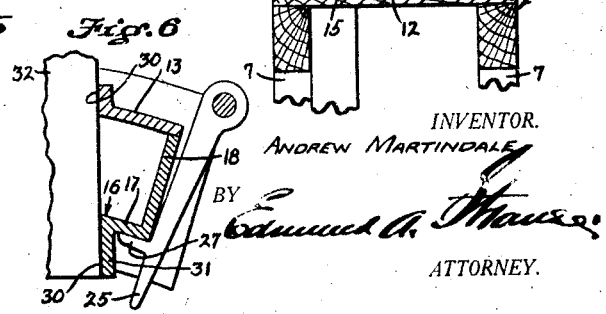
INVENTOR.
ANDREW MARTINDALE
BY
ATTORNEY.

Patented Aug. 2, 1927.

1,637,495

UNITED STATES PATENT OFFICE.

ANDREW MARTINDALE, OF LOS ANGELES, CALIFORNIA.

APPARATUS FOR MOLDING PLASTIC BLOCKS.

Application filed May 29, 1926. Serial No. 112,441.

This apparatus relates more specifically to a manually operated machine for molding plastic blocks for building and other purposes.

A main object of the invention is to provide a manually operated machine for quickly forming plastic blocks and in which the finished blocks may be readily removed from the machine without the necessity of dismantling the apparatus.

Further objects and advantages will be apparent from the following description reference being had to the accompanying drawings in which, Fig. 1 is a front elevation of the machine.

Fig. 2 is a side elevation of the same.

Fig. 3 is a plan view partially in section, taken on line 3—3 of Fig. 1.

Fig. 4 is a central vertical section taken on line 4—4 of Fig. 1.

Fig. 5 is a perspective view of a concrete "cesspool" block formed by the machine.

Fig. 6 is an enlarged sectional plan detail of one end of the mold form showing its front and rear walls and one of the latches.

In the drawings I have illustrated a machine having a mold form especially adapted for forming segmental cored plastic blocks designed to be utilized in the construction of circular "cesspool" walls, but it will be clearly apparent that blocks of other configurations and for many different uses may be made with equal facility.

The apparatue is preferably designed to be mounted upon a table 5 or other suitable support, consisting of a top 6, legs 7 with tamper frame guide bars 8, 9, formed of angle and channel irons suitably secured to the oppositely disposed sides of the table, their upper ends being joined by a transverse beam 10.

Bolted or otherwise suitably secured to the table top are machine supports 11, 12, that carry the rear stationary wall 13 of the mold form. These supports are secured to the ends of the mold wall 13 and support the same a sufficient distance above the table top to permit of the insertion and removal of a mold pallet 14 that rests upon a pair of wood bar supports 15. The front wall 16 of the mold form consists of a main wall 17 having end walls 18, 19 formed integrally therewith, the rear wall 13 and the front wall 16 of the mold are of segmental form in order that the blocks may be readily assembled into a circular wall such as is generally employed in the construction of "cesspools." All the mold walls at their upper and lower ends are provided with outwardly extending flanges for the purpose of insuring strength and stability of structure. Main wall 16 is secured to the table top by means of strap iron hinges 20, 21, in order that the wall may be swung downwardly in the position shown in dotted lines in Fig. 2 to remove the pallet 14 carrying the finished molded block. It will be understood that a fresh pallet is used for every molding operation.

In order that the front and rear walls of the mold form may be held rigidly in relation to each other during a molding operation, latches 25, 26, are employed. These latches are hinged to the rear wall supports 11, 12, as best shown in Fig. 3, and each have tongues 27 that engage the front wall 16 of the mold.

In the form of block molded by the machine as illustrated it is desirable to form a plurality of transverse openings in each block so that when the blocks are assembled to form a circular wall of a "cesspool," suitable drainage from the pool to the ground surrounding the wall may be insured. To this end the rear stationary wall 13 and the front wall 16 of the swinging main wall 17 are provided with a plurality of circular openings 30 each having an outwardly extending circular flange 31 that form bearings for the cylindrical plungers 32 as same are reciprocated through the openings on a molding operation.

These plungers are preferably of solid form and are connected together by an operating bar 33 that passes transversely through the plungers 32 in order to insure simultaneous operation, pins 34 preventing a longitudinal shifting movement of the bar during an operation of the apparatus.

The mechanism for operating the shaft 33 to reciprocate the plungers preferably consists of a transversely disposed rock shaft 35, suitably secured in a pair of bearings 36, 37, bolted to the table top. In order to actuate the plunger operating shaft 33, links 38, 39, are provided their lower ends being rigidly secured to the rock shaft 35 and their slotted upper ends engaging the operating shaft 33, a lever 40 secured to one end of the rock shaft providing a means for operating the same. In order to obviate any binding movement of the plungers during their operation a vertically disposed bearing plate 42 is bolted to the table top, the upper edge of this plate being provided with a plurality of semi-circular bearings 43, one for each plunger.

As a plastic material, such as concrete must be tamped on a molding operation to insure a product of sufficient density, and also to eliminate air bubbles or pockets, a manually operated tamping mechanism is employed, the one illustrated consisting of a transversely disposed bar 45 provided on each end with a shoe 47 provided with a vertical guide slot that engages vertically disposed guide tongues 48 formed on the oppositely disposed faces of the guide bars, 8, 9. Formed integrally with bar 45 are a plurality of downwardly extending bars 50, carrying on their lower ends a tamper plate 51 of the same form and size as the molding cavity of the mold, which it is adapted to enter on a tamping operation. Normally the tamper frame is maintained in a retracted position above the mold form, by means of a pair of coiled springs 52, the springs being attached at their ends to the bars 10 and 45.

The operation of the machine is as follows: The front wall of the mold is swung into latched engagement with the rear wall and the pallet 14 is inserted below the mold. Plastic material, such as concrete is then poured into the mold cavity level with the plunger openings. The tamper frame is then raised and lowered into the mold a number of times to thoroughly tamp the material therein, after which the plungers are reciprocated through the openings in the mold walls by means of the actuating lever 40. After the above operation additional concrete is poured into the mold to fill the same and again tamped to insure the density of the finished product. The plunger frame is again reciprocated to withdraw the plungers from the mold, and the main mold wall 17 is then unlatched and swung downwardly, the finished rock resting on the pallet being then removed from the machine.

From the above description it will be apparent that I have provided a simple molding apparatus by means of which plastic blocks of a variety of configurations may be quickly and economically formed.

What I claim is:

1. A machine for forming plastic blocks comprising an open ended mold form including a stationary rear wall and a front wall having end walls formed integrally therewith, said front wall being hinged to the mold support, means to lock the two walls in rigid relation to each other when the same are in molding relation, a removable pallet disposed below the bottom of the mold to close its lower end opening, and a spring tamper mechanism disposed above the mold for tamping the plastic material after the same has been introduced therein.

2. A machine for forming plastic blocks comprising a base support, a mold form mounted on said base and spaced thereabove, said frame including a stationary side wall and a movable side wall carrying end walls hingedly secured to said base support, a removable support for closing the lower end of said mold form and supporting the molded block, a plunger mechanism for forming cavities in the molded block in a molding operation, and a tamper mechanism disposed above the mold form for tamping the plastic material as the same is introduced thereto.

3. A machine for forming plastic blocks comprising a base support, a metal mold consisting of a stationary side wall, rigidly secured to said support and a movable front wall carrying end walls hingedly secured to said support, latches pivoted to the stationary wall and engaging the movable wall for locking the walls against movement when the same are brought into operative relation to each other, said side walls having alined openings formed therein, a plunger mechanism including a plurality of plungers connected together for simultaneous movement, a rock shaft mounted on said base support, links connecting the plungers and said rock shaft, a lever for actuating said rock shaft to reciprocate the plungers within the alined openings formed in the side walls of the mold form, and a spring controlled tamper frame mounted on said base support for tamping the plastic material as the same is introduced to the mold form.

In witness that I claim the foregoing I have hereunto subscribed my name this 30th day of April, 1926.

ANDREW MARTINDALE.